Aug. 22, 1939.   M. WAIDE   2,170,438
OPTICAL APPARATUS
Filed Feb. 21, 1938
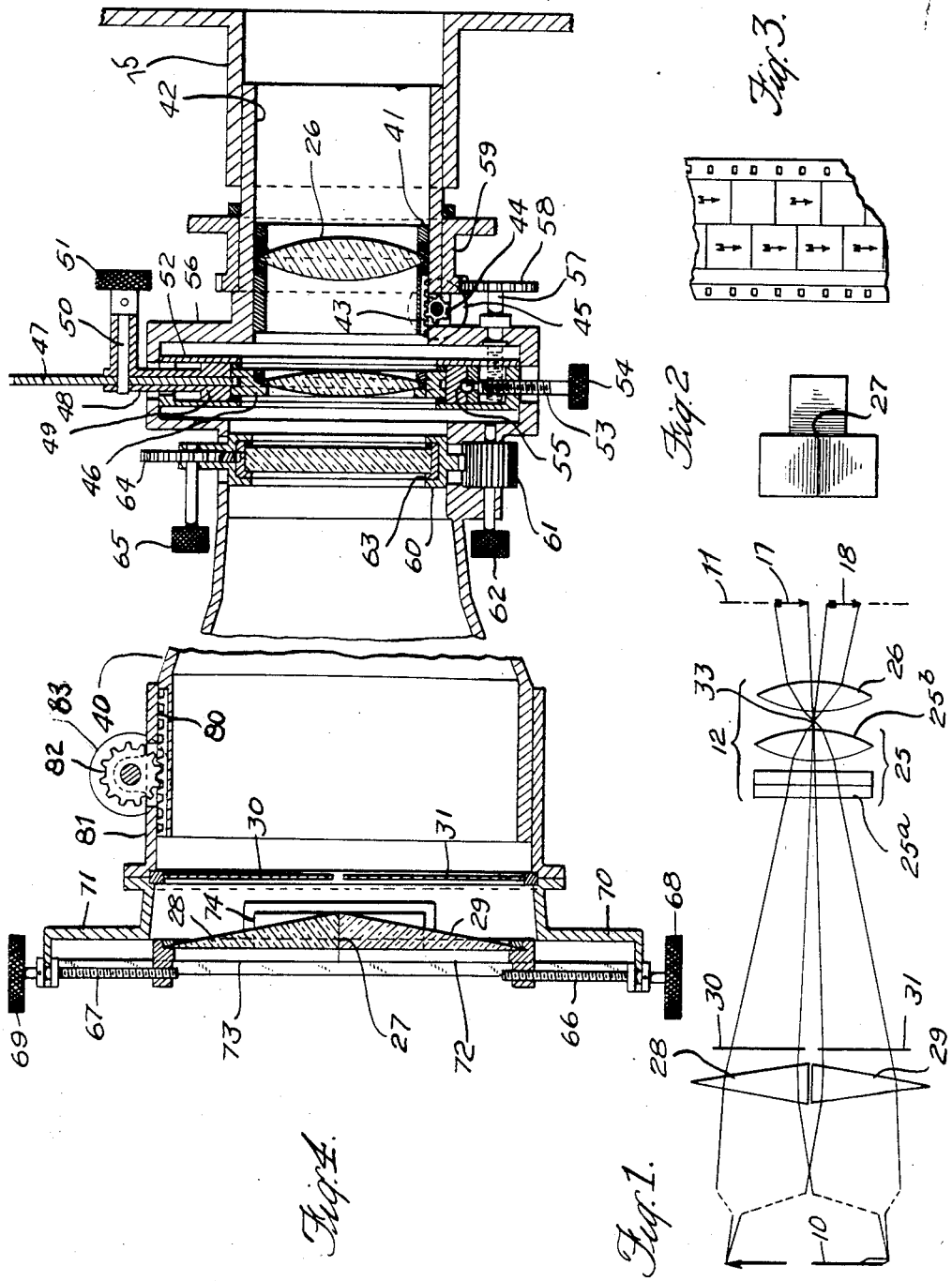
INVENTOR
MERRILL WAIDE
BY Braselton Whitcomb & Davies
ATTORNEYS Patented Aug. 22, 1939

2,170,438

UNITED STATES PATENT OFFICE 2,170,438

OPTICAL APPARATUS

Merrill Waide, Miami, Fla., assignor to Opticolor, Incorporated, New York, N. Y., a corporation of New York Application February 21, 1938, Serial No. 191,649

7 Claims. (Cl. 88—1)

This invention relates to an optical system which may be used in photography to produce a plurality of images of a single object upon a sensitized screen and in projection to produce a single composite image upon a screen from a plurality of photographic records.

Heretofore, in photographing an object in colors or to produce quasi stereoscopic effects there has been considerable difficulty in forming a plurality of images upon a sensitized screen and subsequently superimposing these images to form a single composite projection unless in the latter case the use of a multiple layer of dyed film with its necessary sacrifice of the quality of the image was acceptable. If in photography the rays from a single objective are split by refraction or reflection to form the three images necessary for natural color photography the effective aperture is divided thus causing a serious diminution of illumination. This is especially true at a short focus and in speed work, such as motion pictures, and especially where color filters are used. If the plurality of images formed are the result of adjacent objectives at different points of view then when such images are projected upon a screen at yet another distance serious faults, such as those associated with parallax, are found in the resultant picture.

It is one of the principal objects of this invention to provide an optical system to make use of substantially all of the light passing through a given effective aperture to form each of a plurality of images.

Another object of the invention is to simultaneously cause a plurality of images substantially alike geometrically to be formed upon a sensitized screen from a single object field and to permit the simultaneous superpositioning of such images to form a single composite image when the system is used in projection.

Another object of the invention is to provide an optical system which may be used in photography to form a plurality of images and which will permit photographing scenes at practically any distance without change of the position of the respective images on the film.

Another object of the invention is to provide an optical system which may be used in projection and which will permit operation at practically any screen distance with the images substantially superimposed upon the screen.

A further object of the invention is to provide an optical system having a relatively great depth of focus by reducing the parallax in photographing when using the major portion of the effective aperture of each of several adjacent objectives.

A still further object of the invention is to provide an optical system by which some quasi stereoscopic effects may be obtained.

Other objects of the invention are to provide an optical system in which sharpness of line may be obtained when optically superimposing a plurality of photographic records upon a screen, to obtain a cancellation of the visibility of the emulsion grain by the superimposing of a plurality of photographs, to obtain natural color images correct throughout the object field by use of the major portion of the effective aperture in an additive process, to permit greater range of values by the ability to use softer light, and to permit either visual or scale focusing by well-known movements or devices.

This application is a continuation-in-part of my copending application Serial No. 740,588, filed August 20, 1934, now Patent No. 2,115,153 which is a division of application Serial Number 432,325 filed March 1, 1930, now Patent No. 1,970,678.

In the accompanying drawing which includes optical diagrams showing the nature and relation of parts of a possible embodiment of my invention, the same parts are designated by like reference characters:

Fig. 1 is a diagram showing the principal rays of light passing through an optical system arranged in accordance with one embodiment of my invention;

Fig. 2 is a front view of the prisms used in the system;

Fig. 3 is a front view of a moving picture film showing three photographic records thereon; and Fig. 4 is a sectional view of a barrel with the various optical parts in position showing conventional means for adjusting the same.

While lenses of certain configuration are shown in the various diagrams and are illustrated as single lenses it is to be understood that any one of the lenses shown may be composed of several parts in order to correct any or all of the well-known errors found in lenses such as coma, aberration, astigmatism, etc., and no attempt has been made in these figures to illustrate these corrections which are well-known in the art.

The use of the invention will first be explained in connection with photography to make image records of an object upon a sensitized film. Referring then more specifically to Fig. 1, an arrow 10 is illustrated as the object to be photographed. A sensitized film 11 is adapted to receive the image or images of the arrow 10 in order to record them photographically thereon. A lens combination 12 and prisms 28 and 29 are placed between the object 10 and the sensitized film 11, forming an adjustable combination which serves as the image forming objective. The lens combination 12 includes the converging lens units 25 and 26, the former consisting of two mutually perpendicular cylindrical lenses 25a and 25b, and the latter the positive lens unit 26. As means for forming two images I provide a plurality of prisms 28 and 29, the prism 28 refracting the rays of light from the object 10 to form the image 18, and the prism 29 refracting the object rays to form the image 17. Color screens 30 and 31 may be used adjacent the prisms 28 and 29 respectively, or the prisms may be made of colored glass so as to give the proper color to the images 17 and 18. Where three prisms are used the primary colors red, blue-violet and green may be used to form images of red, blue-violet and green, and these color screens may be positioned in accordance with well known practice on either side of the prisms but preferably on the side having the common prism surfaces. It will be seen that if the prisms 28 and 29 have color screens 30 and 31 of different colors the corresponding images 17 and 18 will be colored accordingly. If the arrow 10 has, for instance, a red head and a blue feather and the color screens 30 and 31 are red and blue respectively, the red head will appear in the image 17 while the blue feather will appear in the image 18. When positives of these two images are superimposed by reversing this system in a manner hereinafter described, it will be evident that the arrow will appear in its proper colors in the projected image.

Any number of prisms may be used depending on the number of images desired but these prisms should preferably be so positioned that their bases contain the axis of the lens combination 12 and active faces of each prism have between them a plane perpendicular to the axis of the system, such plane having said relation to all of the prisms. The prisms are also arranged as closely as possible to each other and far enough from lenses 12 so that each prism will intercept all of the light required for its corresponding image and none of the light for any of the other images.

Where three prisms are used their positioning is indicated in Fig. 2. In this construction the base of each of the prisms 1, 2 and 3 falls on the line 27 which coincides with the axis of the lens combination 12. As clearly indicated by the shading in this figure the angle of each of the prisms contains a plane perpendicular to line 27 and the intersection of the active faces of each is remote from line 27.

The refractive power of the prisms is such as to refract, in photography, light from the objects so that the lenses will form a plurality of images, and in projection, light from the plurality of photographs which has passed the lenses, so that the rays will form a single composite image on the screen at the front focal plane of the system. All rays from the same point on the object striking the prism 28 are diverted to the same point on the image 18 and all rays from the same point on the object striking the prism 29 are diverted to the same point on the image 17.

The focusing of the construction shown in Fig. 1 is effected primarily by altering the separation between lenses 25 and 26 to make the power of the combination such that the prisms will function for a given distance of screen, then moving the entire combination until the image is sharp for said distance. The photographs and screen in projection will then lie in the conjugate focal planes of the combination. The power of the lens combination should be such that in projection the prisms of the power used will superimpose the images upon the screen.

In photography the film images should have a predetermined relationship determined by the requirements of film size and projection. While proper focusing is mainly secured by adjustment of the positive lens 26 and the optical unit as a whole, image placing is secured primarily by adjustment of the cylindrical lenses and the prisms. A lateral shift of the cylindrical lens 25a, for example, may cause horizontal shift of the images and a similar shift of lens 25b would cause a vertical movement of the images. Rotation of the cylindrical lenses would also rotate the images.

Relative movement of the images is also caused by movement of the prisms relative to the lenses or by radial movement of the prisms.

Each of these various adjustments assists in securing the correct adjustment of the images, both as to proper spacing and definition. These adjustments similarly insure a clearly defined and unitary projection of the images on the screen.

In the arrangement shown in Fig. 1, the system amounts substantially to an objective of alterable focal length owing to the alterable separation between its elements 25 and 26 acting in conjunction with the prisms 28 and 29 between the objective and the composite image. The rays are shown drawn through the optical center 33 of the compound objective. The practical effect of the arrangement is to provide a system in which the focal distance of the positive lens 26 is substantially equal to one of the focal distances of the system and the focal distance of the lens 25 is substantially equal to the other focal distance of the system.

Attention is drawn to the great latitude in adjustment and superimposing provided by the adjustable cylindrical lenses. Focusing of one of these cylindrical lenses independently causes a relative movement of the plurality of images in one direction while a focusing of the other causes a relative movement in a perpendicular direction. Rotation of each cylindrical lens gives yet another adjustment of the relative spacing of the images. Thus independent adjustment for two directions of the image plane is attained and yet there will be no substantial effect upon distortion or definition of the image. To accomplish this end the two cylindrical lenses are preferably provided with independently adjustable mechanism of any suitable nature so that they may be shifted laterally and also rotated to give certain desired effects in bringing about focusing of the images. The cylindrical lenses 25a and 25b, being susceptible to adjustment in mutually perpendicular planes, have the effect as regards convergency of a spherical lens with this exception, that whereas a spherical lens will tend to converge to a point the lens combination will tend to converge to a caustic with dimensions alterable in accordance with the setting of the individual cylindrical lens.

In Fig. 1 the lens combination 12 is formed of a plurality of lenses for the purpose of changing the focal length of the combination so that objects at different distances from the camera may be photographed, or in projection the projecting device may be fixed at different distances from the screen. However, if the distance of the object or screen from the apparatus is fixed a single convergent lens having a focal length equal to that of the lens combination may be used, but in that case, of course, there would be no adjustment of the lens, the whole apparatus having to be positioned at the proper distance from the object or screen.

It will be evident from the above that I have provided a system which may be used in either photography or projection and which makes use of substantially all of the light falling upon the system from a given object field to form a plurality of images in photography, which images may be superimposed in projection to form a composite image. The formation of a plurality of images or the superimposing of these images is done optically with a minimum loss of light so that considerably less light is needed for either photography or projection. It will also be noted that the lens combination of the invention permits focusing and that in photography the images are automatically positioned when they are in focus so that photographs of distant or near objects may be successively projected without change of focus in projection after the projector has been focused on a given screen.

Any of the well-known means may be used for moving the lenses with respect to each other. For example, I have shown in Fig. 4 a barrel 40 approximating a conical formation with the prisms 28 and 29 at the enlarged end and the lens combination 12 at the small end. The lens 26 is mounted in a shell 41 slidably mounted within the cylindrical end portion 42 of the barrel 40. To this end the shell is provided with rack teeth 43 adapted to register with the pinion 44 which is in turn operated by the knurled head 45. The cylindrical lens 25b is mounted in a circular frame 46 having edge teeth adapted to register with the teeth of pinion 47 which, as shown, is supported on a hollow standard 48 resting on the movable frame 49 surrounding the frame 46. The pinion shaft 50 terminates in an operating head 51 by which the pinion 47 is rotated and the cylindrical lens 25b given a limited rotational movement. The external frame 49 of cylindrical lens 25b is mounted within an external casing 52 so as to have slidable movement therein in one direction. Such movement is brought about by means of the screw 53 having a knurled head 54 and screw threaded engagement with the edge of the casing 52 whereby through the ball and socket connection 55 to the outer frame 49 the cylindrical lens 25a is susceptible of lateral movement. It is noted that the frame and casing construction of the lens 25b is placed in a portion of the barrel offset outwardly to form the ridged portion 56.

In addition to the adjusting mechanism hereinabove described, I also utilize adjusting means for shifting the lens 25b axially. This mechanism includes a pin 57 mounted on the ridge 56 for rotatable movement only, the inner end of the pin being threaded and having threaded engagement with the casing wall 52, and the other end of the pin terminating in a pinion 58 which in turn meshes with teeth formed on the periphery of the manually rotatable ring 59 mounted on the cylindrical section 42 of the barrel. It is evident that rotation of this ring will cause an axial movement of the lens 25b.

Means are provided also for lateral and rotational adjustment of lens 25a. For these adjustments the lens 25a is mounted in an outer frame 60 capable of limited rotational movement and provided with teeth engaging the pinion 61 and adapted to be operated by the knurled head 62. Within the frame 60 is a second inner frame 63 which is susceptible of sliding movement in relation to the frame 60. The edge of the frame is cut with teeth adapted to engage cooperating teeth of pinion 64 which is rotated by means of the knurled head 65. There is thus provided for lens 25a a limited rotational as well as a lateral movement.

The large end of the barrel 40 terminates in a cylindrical section having a rack 80 integral therewith. A slidable sleeve 81 supports a pinion 82 which meshes with rack 80 and connects to knurled head 83 whereby axial movement of the sleeve is made possible.

The sleeve 81 supports also the color screens 30 and 31 and the prisms 28 and 29. These prisms are placed base to base in frames 72 and 73 so that their bases coincide with the optical axis of the lenses and a surface of either lies in a common plane. Opposed edges of the frame are extended forwardly to form lugs in which the screws 66 and 67 have movement. These screws also are supported on the offset shoulders 70 and 71 of the sleeve 81 so as to have rotational but non-axial movement. Rotation of the screw heads 68 and 69 therefore cause reciprocation of the prisms and aids in securing a proper focus of the apparatus. An aperture 74 formed in the barrel 40 serves to facilitate the prism adjustment.

For convenience I have illustrated the color screens 30 and 31 adjacent the prisms 28 and 29 and intermediate the prisms and the lens combination 12. It is generally preferable, however, to place the color screens adjacent the side of the prisms which lie in a common plane to reduce distortion.

The barrel 40 bearing the entire optical system may be adjusted by axial movement of the end collar 75.

It is obvious that variations may be made in the structure shown in the drawing without departing from the spirit of the invention and I do not, therefore, desire to limit myself to what has been shown and described except as such limitations occur in the appended claims.

What I claim is:

1. In apparatus for color photography on film and projection on screens, a lens unit comprising a positive lens and two mutually perpendicular cylindrical lenses, said lenses being disposed in juxtaposition along the main optical axis of the apparatus in the order of positive lens, cylindrical lens and cylindrical lens, plural prisms each having a face surface perpendicular to the optical axis and lying in an approximately common plane displaced from said lens unit, said prisms having a common point lying on the optical axis of the system, means for coloring differently the rays of light passing through each of said prisms, means for independently adjusting each lens with reference to the other lenses and with reference to the prisms, and additional means for adjusting the prisms with reference to each other.

2. In an optical system a convergent lens unit having a focal length substantially equal to one focal distance of said system, a second convergent lens unit having a focal length substantially equal to the other focal distance of said system and having a common axis with said first mentioned lens unit, and a plurality of prisms spaced from said lens units and having their bases in contact along said axis, means for adjusting said lens units with respect to each other and with respect to said prisms, at least one of said units comprising a pair of independently adjustable cylindrical lenses active in mutually perpendicular planes, and means to color differently the rays of light passing through said prisms.

3. In an optical system a convergent lens unit having a focal length substantially equal to one focal distance of said system, a second convergent lens unit having a focal length substantially equal to the other focal distance of said system and positioned adjacent and along a common axis with said first mentioned lens unit, and a plurality of prisms spaced along said axis from said lens units and having a plane surface perpendicular to said axis, said lens units being adjustable with respect to each other and with respect to said prisms and at least one of them comprising a pair of independently adjustable cylindrical lenses active in mutually perpendicular planes, and means to color differently the rays of light passing through said prisms.

4. In apparatus for color photography on film and projection on screens, a support, an optical unit designed to receive light from a single or multiple object and project multiple or single images in color in accordance with direction of light transmitted, said optical unit comprising a light converging sub-unit having two independently mounted cylindrical lens elements active in mutually perpendicular planes, a positive lens, a plurality of prisms having a plane surface substantially perpendicular to the optical axis of the system, each prism having a portion coincidental with the axis of the optical system, means for coloring differently the rays of light passing through said prisms, mounts for holding each of said lenses and said prisms along a common axis in the line of light transmitted through the apparatus in the order of prisms, cylindrical lens, cylindrical lens, positive lens, and means for adjusting the position of each of said mounts with relation to the others so as to focus the cylindrical lens sub-unit, the positive lens and the prisms on the screen and film, whereby as a camera plural images in diverse color are formed on the film, and as a projector a single image in colors is formed on the screen.

5. In apparatus for color photography on film and projection on screens, a support, an optical unit designed to receive light from a single or multiple object and project multiple or single images in color in accordance with direction of light transmitted, said optical unit comprising a light converging lens sub-unit having two independently mounted cylindrical lens elements active in mutually perpendicular planes, a positive lens unit, a plurality of prisms having portions of their bases coinciding with the axis of the lens unit, means for coloring differently the rays of light passing through said prisms, mounts for holding each of said cylindrical lens elements, said positive lens and said prisms along a common light transmitting axis in the order of prisms, cylindrical lens, cylindrical lens, positive lens, and means for adjusting the position of each of said mounts with relation to the others so as to focus the cylindrical lens sub-unit, converging lens and prisms on the object or screen, including devices for shifting each cylindrical lens mount laterally and rotationally, for varying the axial spacing of said cylindrical lens mounts, for permitting axial adjustment of the positive lens mount with reference to the cylindrical lens mounts and to permit radial and axial adjustment of the prisms, whereby as a camera plural images in diverse color are formed on the film, and as a projector a single image in colors is formed on the screen.

6. In apparatus for color photography on film and projection on screens, a support, an optical unit mounted on said support and designed to receive light from a single or multiple object and project multiple or single images in color in accordance with direction of light transmitted, said optical unit comprising a light converging lens sub-unit having two independently mounted cylindrical lens elements active in mutually perpendicular planes, a positive lens unit, a plurality of coplanar prisms, said lenses and prisms lying along the optical axis of the system and said prisms being radially disposed relative to said axis, the light converging lens sub-unit being interposed between the positive lens unit and the prisms, a color screen adjacent each of said prisms, the colors of each screen differing from the others, mounts for holding each of said cylindrical lenses, said positive lens unit and each of said prisms, and means for adjusting the position of each of said mounts with relation to the others so as to focus the cylindrical lens sub-unit and positive lens unit and prisms on the object or screen, including devices to shift each cylindrical lens element mount laterally and rotationally, to vary the axial spacing of said cylindrical lens element mounts, to permit axial adjustment of the positive lens unit and to vary the axial displacement between the prisms and the cylindrical lens elements, whereby as a camera plural images in diverse color are formed on the film, and as a projector a single image in colors is formed on the screen.

7. In apparatus for color photography on film and color projection on screens, a support, an optical unit mounted on said support designed to receive light from a single or multiple object and project multiple or single images in color in accordance with the direction of light transmitted, said optical unit comprising two cylindrical lens elements, a positive lens unit, plural prisms having their effective surfaces radially disposed with reference to the optical axis of the system, means for coloring differently the light passing through said prisms, mounts for each of said lens elements and said prisms for holding said elements along the unit axis in the order of prisms, cylindrical lens elements and positive lens unit, and means for varying the axial distance between said lens mounts and between said prism and lens mounts and for changing the angular relationship of said cylindrical lens element mounts, whereby plural images in color may be formed on the film and a single image in color on the screen.

MERRILL WAIDE.